(12) United States Patent
Hasegawa

(10) Patent No.: US 8,472,045 B2
(45) Date of Patent: Jun. 25, 2013

(54) IMAGE-PROCESSING APPARATUS AND IMAGE-PROCESSING METHOD UTILIZING INTERMEDIATE DATA

(75) Inventor: Kazuhide Hasegawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1063 days.

(21) Appl. No.: 12/171,571

(22) Filed: Jul. 11, 2008

(65) Prior Publication Data

US 2009/0015864 A1 Jan. 15, 2009

(30) Foreign Application Priority Data

Jul. 12, 2007 (JP) ................................ 2007-183433

(51) Int. Cl.
*G06F 3/12* (2006.01)
*G06K 15/00* (2006.01)

(52) U.S. Cl.
USPC .................... 358/1.15; 358/1.16; 358/1.13

(58) Field of Classification Search
None
See application file for complete search history.

(56) References Cited

U.S. PATENT DOCUMENTS

| | | | | |
|---|---|---|---|---|
| 6,608,692 | B1* | 8/2003 | Shibahara et al. | 358/1.13 |
| 6,912,061 | B1* | 6/2005 | Ozaki | 358/1.15 |
| 2002/0051195 | A1* | 5/2002 | Arakawa | 358/1.15 |
| 2003/0072030 | A1* | 4/2003 | Haines et al. | 358/1.15 |
| 2003/0137693 | A1* | 7/2003 | Nishio | 358/1.15 |
| 2003/0154395 | A1* | 8/2003 | Miura et al. | 713/200 |
| 2005/0198069 | A1* | 9/2005 | Cherry et al. | 707/104.1 |
| 2005/0200875 | A1* | 9/2005 | Sugimoto et al. | 358/1.13 |
| 2007/0133031 | A1* | 6/2007 | Takaragi et al. | 358/1.13 |

FOREIGN PATENT DOCUMENTS

| | | |
|---|---|---|
| JP | 2000-168148 A | 6/2000 |
| JP | 2001-219601 A | 8/2001 |
| JP | 2001-219606 A | 8/2001 |
| JP | 2004-110337 A | 4/2004 |
| JP | 2006-15610 A | 1/2006 |
| JP | 2006-015610 A | 1/2006 |
| JP | 2006-159458 A | 6/2006 |

* cited by examiner

*Primary Examiner* — Ming Hon

(74) *Attorney, Agent, or Firm* — Canon USA, Inc., IP Division

(57) ABSTRACT

An object-data item optimized for print settings is acquired from an image-processing apparatus and/or another image-processing apparatus, and intermediate data including a combination of plural object-data items including the acquired optimized object-data item is generated. The generated intermediate data is converted into bitmap data generated in pages so that intermediate data optimized for the print settings can be used in arbitrary objects. Therefore, printing and outputting can be performed by using the intermediate data with increased speed.

5 Claims, 17 Drawing Sheets

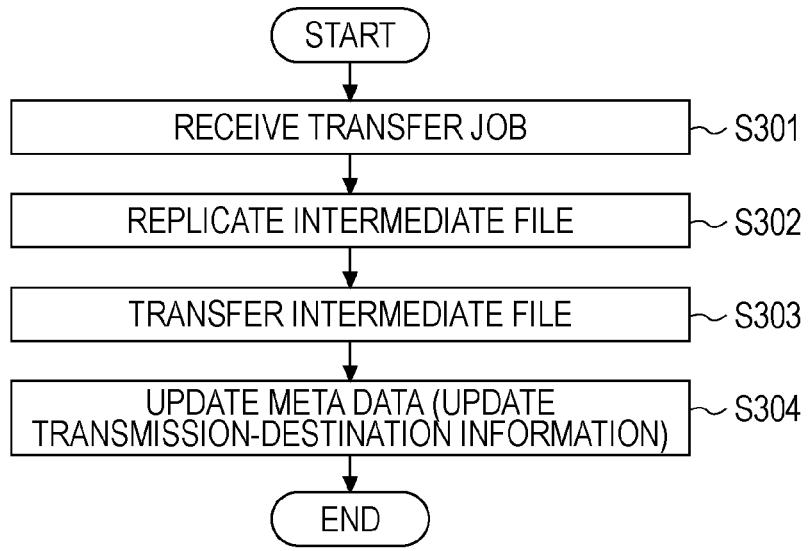
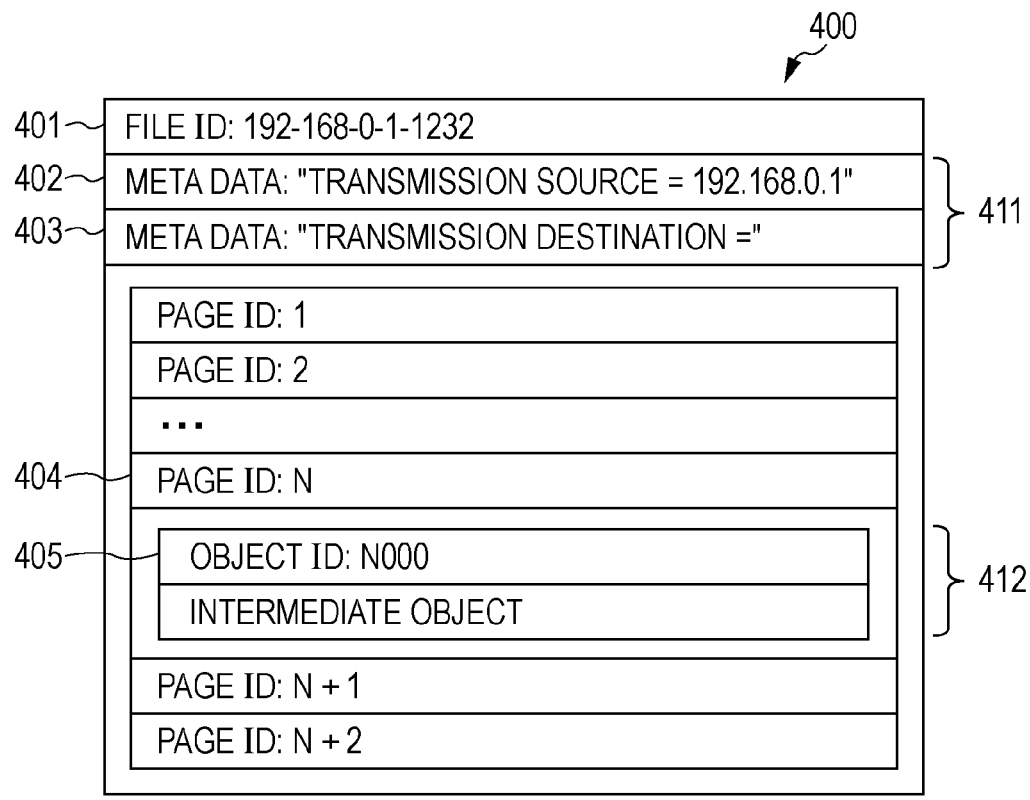

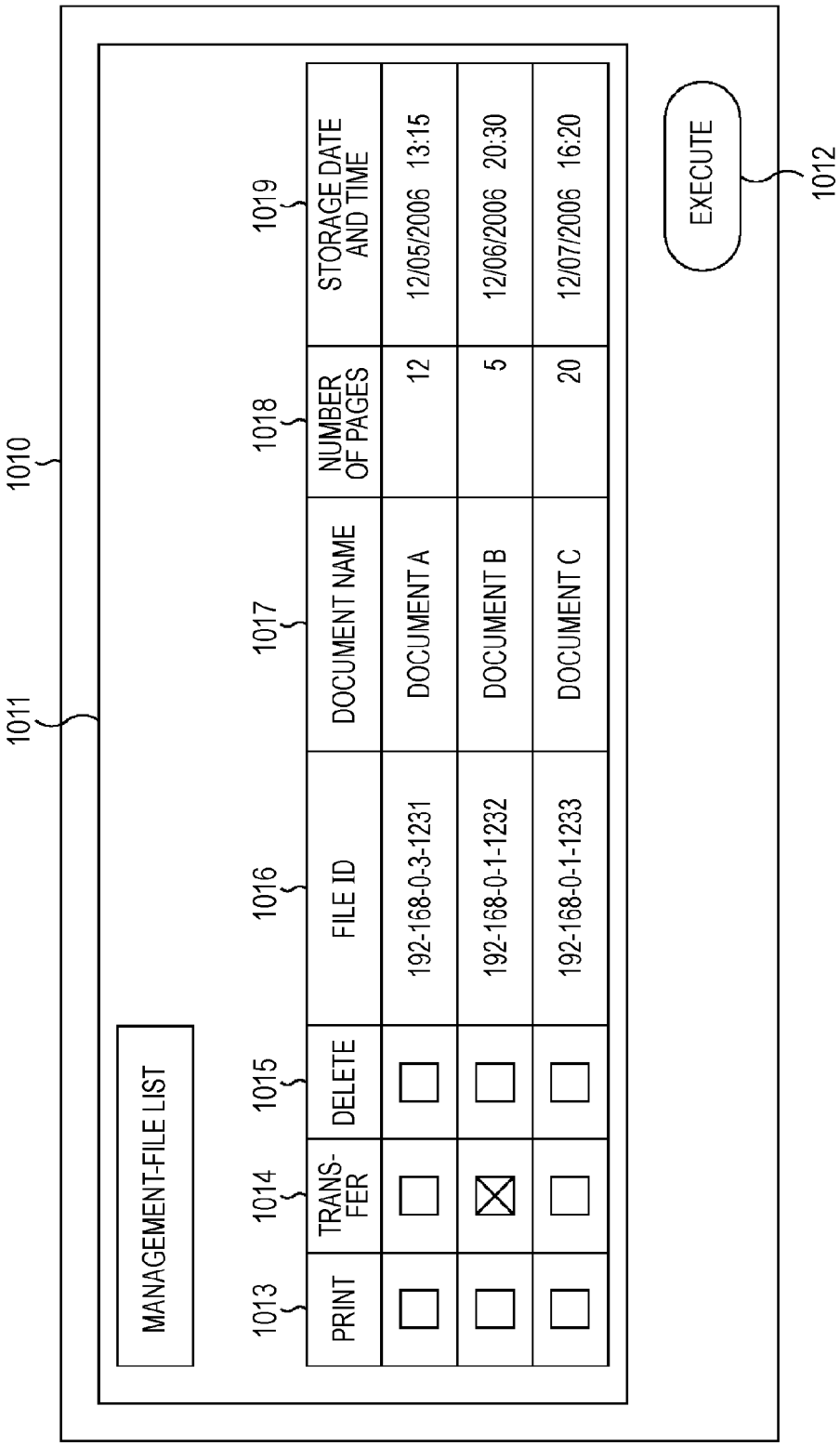

FIG. 12

| DRAWING CAPABILITY | STORAGE-PROPRIETY FLAG |
|---|---|
| SCALABLE FONT (TrueType) | ○ |
| SCALABLE FONT (Type1) | ○ |
| IMAGE (JPEG) | ○ |
| IMAGE (RunLength) | × |
| PATTERN-REGISTRATION SIZE (LESS THAN 256 KB) | ○ |

FIG. 13

| OBJECT FORMAT | STORAGE-PROPRIETY FLAG |
|---|---|
| BITMAP FONT | × |
| SCALABLE FONT | ○ |
| IMAGE (COLOR) | ○ |
| IMAGE (MONOCHROME) | ○ |
| GRAPHIC (SOLID FILLED) | ○ |
| GRAPHIC (INCORPORATED PATTERN) | × |
| GRAPHIC (REGISTERED PATTERN) | ○ |

FIG. 16

| DRAWING CAPABILITY | STORAGE-PROPRIETY FLAG |
|---|---|
| SCALABLE FONT (TrueType) | × |
| SCALABLE FONT (Type1) | × |
| IMAGE (JPEG) | ○ |
| IMAGE (RunLength) | ○ |
| PATTERN-REGISTRATION SIZE (LESS THAN 512 KB) | ○ |

FIG. 17

| OBJECT FORMAT | STORAGE-PROPRIETY FLAG |
|---|---|
| BITMAP FONT | × |
| SCALABLE FONT | × |
| IMAGE (COLOR) | × |
| IMAGE (MONOCHROME) | ○ |
| GRAPHIC (SOLID FILLED) | ○ |
| GRAPHIC (INCORPORATED PATTERN) | × |
| GRAPHIC (REGISTERED PATTERN) | ○ |

FIG. 19

| | META-DATA-INQUIRY PACKET 1900 | 1902 |
|---|---|---|
| 1901 | OBJECT ID | OPTIMIZATION INFORMATION |
| 1903 | ... | OPT = "4up" |
| 1904 | N120 | OPT = "4up" |
| 1905 | N130 | OPT = "4up" |
| 1906 | N140 | OPT = "4up" |
| 1907 | N210 | OPT = "4up" |
| 1908 | N220 | OPT = "4up" |
| 1909 | N230 | OPT = "4up" |
| 1910 | ... | OPT = "4up" |

FIG. 20

| | META-DATA-RETURN PACKET 2010 | 2012 | 2013 |
|---|---|---|---|
| 2011 | ORIGINAL OBJECT ID | OPTIMIZED OBJECT ID | OPTIMIZATION INFORMATION |
| 2014 | ... | ... | OPT = "4up" |
| 2015 | N120 | N121 | OPT = "4up" |
| 2016 | N130 | N131 | OPT = "4up" |
| 2017 | N220 | N221 | OPT = "4up" |
| 2018 | ... | ... | OPT = "4up" |

# IMAGE-PROCESSING APPARATUS AND IMAGE-PROCESSING METHOD UTILIZING INTERMEDIATE DATA

BACKGROUND OF THE INVENTION

1. Field of the Invention

The present invention relates to an image-processing apparatus and an image-processing method, and is particularly appropriate for executing printing by using intermediate data.

2. Description of the Related Art

Hitherto, image data and/or intermediate code that was subjected to raster-image-processor (RIP) processing has been stored in jobs, as output data, after print-job processing is finished, so as to achieve print processing with high speed. Then, data on print settings made for the output data (print job) has been managed as history information. After that, when performing a print job corresponding to the same print settings as the managed print settings, output data corresponding to the same print settings has been used so that the print processing can be performed with high speed.

According to Japanese Patent Laid-Open No. 2006-15610, print data is converted into output data and stored as history-file data in association with print settings, storage destination, and the user's name. An image-forming apparatus disclosed in Japanese Patent Laid-Open No. 2006-15610 reads the history-file data corresponding to a user who had issued a print request and specifies history information matching with data on "file name and print settings" for which the user had issued the print request. When the history information corresponding to the print request is specified, printing is performed by using the output data stored at the storage destination of the history information.

However, since the print-setting data and the output data for storage are managed in print jobs in the image-processing apparatus disclosed in Japanese Patent Laid-Open No. 2006-15610, the entire print-job data needs to be transmitted and/or received when the output data is reused. Consequently, the size of data transmitted and/or received on a network, and the time required to transmit and/or receive the data are increased so that printing and outputting may be performed with decreased speed.

Accordingly, the present invention has been achieved, so as to increase the speed of printing executed by using intermediate data.

SUMMARY OF THE INVENTION

An image-processing apparatus according to an embodiment of the present invention includes an input unit configured to input print-setting data and print-target-file data, an acquisition unit configured to acquire intermediate data corresponding to the input print-setting data from an external device for at least one object-data item included in the input print-target-file data, and a print-processing-execution unit configured to execute print processing by, at least, generating print data by using the intermediate data acquired for the object data by the acquisition unit.

Further features and aspects of the present invention will become apparent from the following description of exemplary embodiments with reference to the attached drawings.

BRIEF DESCRIPTION OF THE DRAWINGS

FIG. 3 is a flowchart illustrating an example of a processing performed by an image-processing apparatus, so as to transfer the intermediate-file data to another image-processing apparatus according to the first embodiment.

FIG. 4 conceptually shows an exemplary configuration of intermediate-file data stored in the image-processing apparatus according to the first embodiment.

FIG. 5 shows an example of a management-file-list-operation-screen image displayed on an operation unit of the image-processing apparatus according to the first embodiment.

FIG. 12 shows a first example of a drawing-capability-information-management table managed by a capability-information-management unit of the image-processing apparatus according to the first embodiment.

FIG. 13 shows a first example of a storage-setting-by-object-management table managed by the capability-information-management unit of the image-processing apparatus according to the first embodiment.

FIG. 16 shows a second example of a drawing-capability-information-management table managed by the capability-information-management unit of the image-processing apparatus according to the first embodiment.

FIG. 17 shows a second example of a storage-setting-by-object-management table managed by the capability-information-management unit of the image-processing apparatus according to the first embodiment.

FIG. 19 conceptually shows an example of a meta-data-inquiry packet transmitted when an inquiry about meta data (optimization information) is made to another image-processing apparatus according to the first embodiment.

FIG. 20 conceptually shows an example of a meta-data-return packet returned from another image-processing apparatus according to the first embodiment.

DESCRIPTION OF THE EMBODIMENTS

First Embodiment

A first embodiment of the present invention will be described with reference to the attached drawings.

Figure 1:
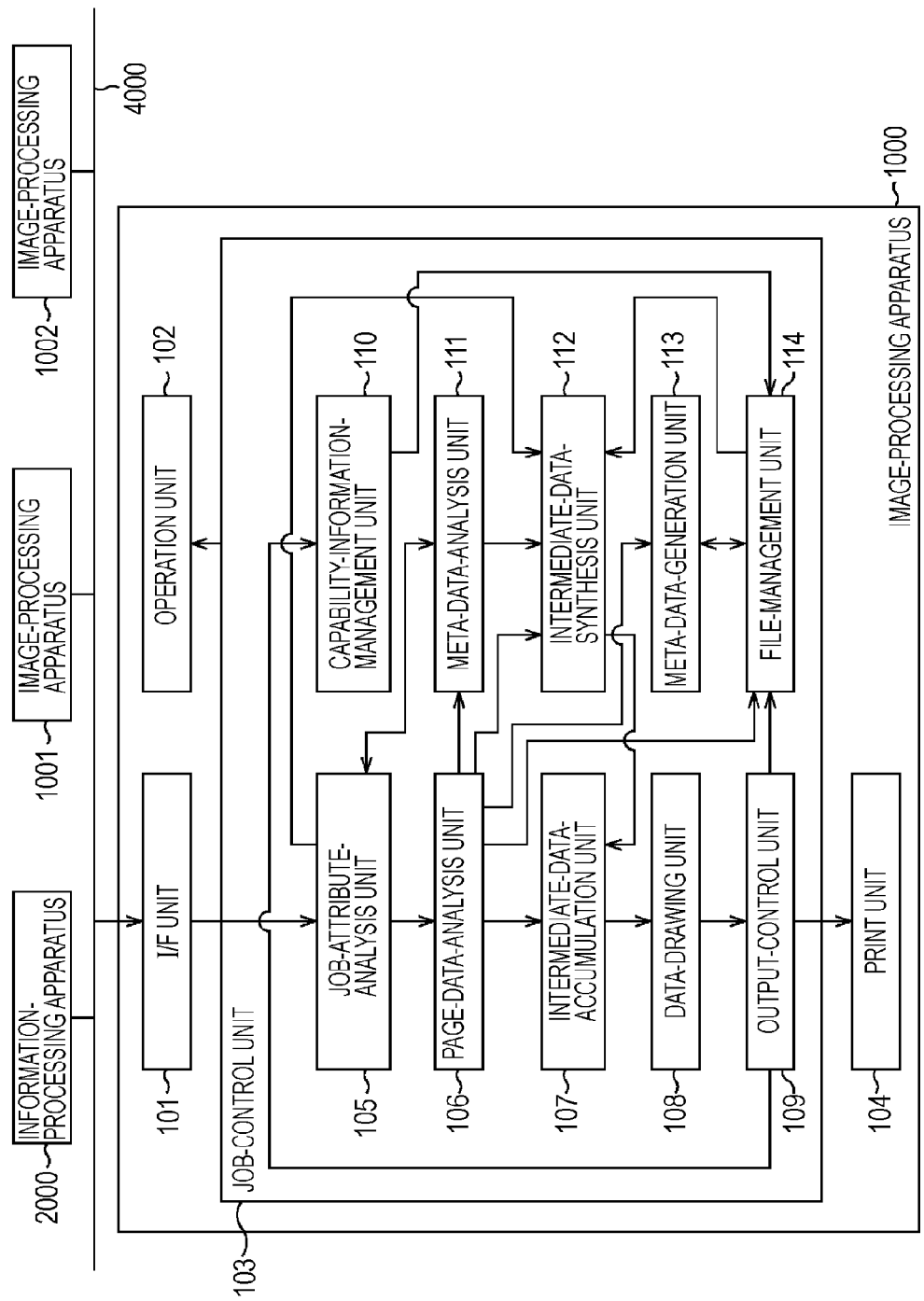
FIG. 1 shows an exemplary configuration of an image-processing system according to a first embodiment of the present invention.

FIG. 1 shows an example configuration of an image-processing system. In FIG. 1, image-processing apparatuses 1000, 1001, and 1002 have the same configuration. Therefore, FIG. 1 illustrates the configuration of the image-processing apparatus 1000 alone and illustration of the configuration of each of the image-processing apparatuses 1001 and 1002 is omitted.

In FIG. 1, the image-processing apparatus 1000 is connected to an information-processing apparatus 2000, and the image-processing apparatuses 1001 and 1002 via a network 4000 so that communications can be established between the above-described apparatuses. The information-processing apparatus 2000 is a commercially available computer (e.g., a personal computer (PC)) including a central-processing unit (CPU), a display, a keyboard, a mouse, a hard disk, a memory, an interface (I/F) designed for performing network communications, etc.

The image-processing apparatus 1000 includes an I/F unit 101, an operation unit 102, a job-control unit 103, and a print unit 104. The I/F unit 101 externally transmits and/or receives data (e.g., data on a print job). The operation unit 102 directly receives an instruction request transmitted from a user. In the first embodiment, the operation unit 102 is provided with a touch panel in addition to buttons. The job-control unit 103 performs various types of control-processing procedures for the print-job data. The print unit 104 forms an image based on the print-job data, and prints and outputs the image.

Further, in the job-control unit 103, a job-attribute-analysis unit 105 analyzes the job attribute of the print job. A page-data-analysis unit 106 analyzes data on each page of the print job and converts the page data into intermediate data generated in objects (a display list or the like). An intermediate-data-accumulation unit 107 stores the intermediate data converted through the page-data-analysis unit 106 in an area specifically provided for a memory including a random-access memory (RAM) or the like.

A data-drawing unit 108 converts the intermediate data generated in objects, the intermediate data being stored by the intermediate-data-accumulation unit 107, into bitmap data generated in pages. An output-control unit 109 converts the bitmap data generated in pages into a video signal. Then, the output-control unit 109 performs image-transfer processing, so as to transfer the video signal, in synchronization with the image-forming processing and paper-feed processing that are performed by the print unit 104.

A capability-information-management unit 110 manages information about capabilities of the image-processing apparatus 1000. A meta-data-analysis unit 111 analyzes meta data included in the intermediate data. An intermediate-data-synthesis unit 112 synthesizes the intermediate data generated in objects, the intermediate data being converted by the page-data-analysis unit 106, and/or intermediate data stored in a file-management unit 114, and intermediate data transmitted from other image-processing apparatuses, that is, the image-processing apparatuses 1001 and 1002 via the I/F unit 101. Further, the intermediate-data-synthesis unit 112 can synthesize plural intermediate-data items generated in objects, the intermediate-data items being converted by the page-data-analysis unit 106, and/or plural intermediate-data items stored in the file-management unit 114. Further, the intermediate-data-synthesis unit 112 can synthesize plural intermediate-data items transmitted from the other image-processing apparatuses 1001 and 1002.

The meta-data-generation unit 113 generates meta data including optimization information or the like for the intermediate data generated in objects, the intermediate data being converted by the page-data-analysis unit 106. The file-management unit 114 stores and manages the intermediate data generated in objects in a memory such as a hard disk, as intermediate-file data, the intermediate data being converted by the page-data-analysis unit 106.

Figure 2:
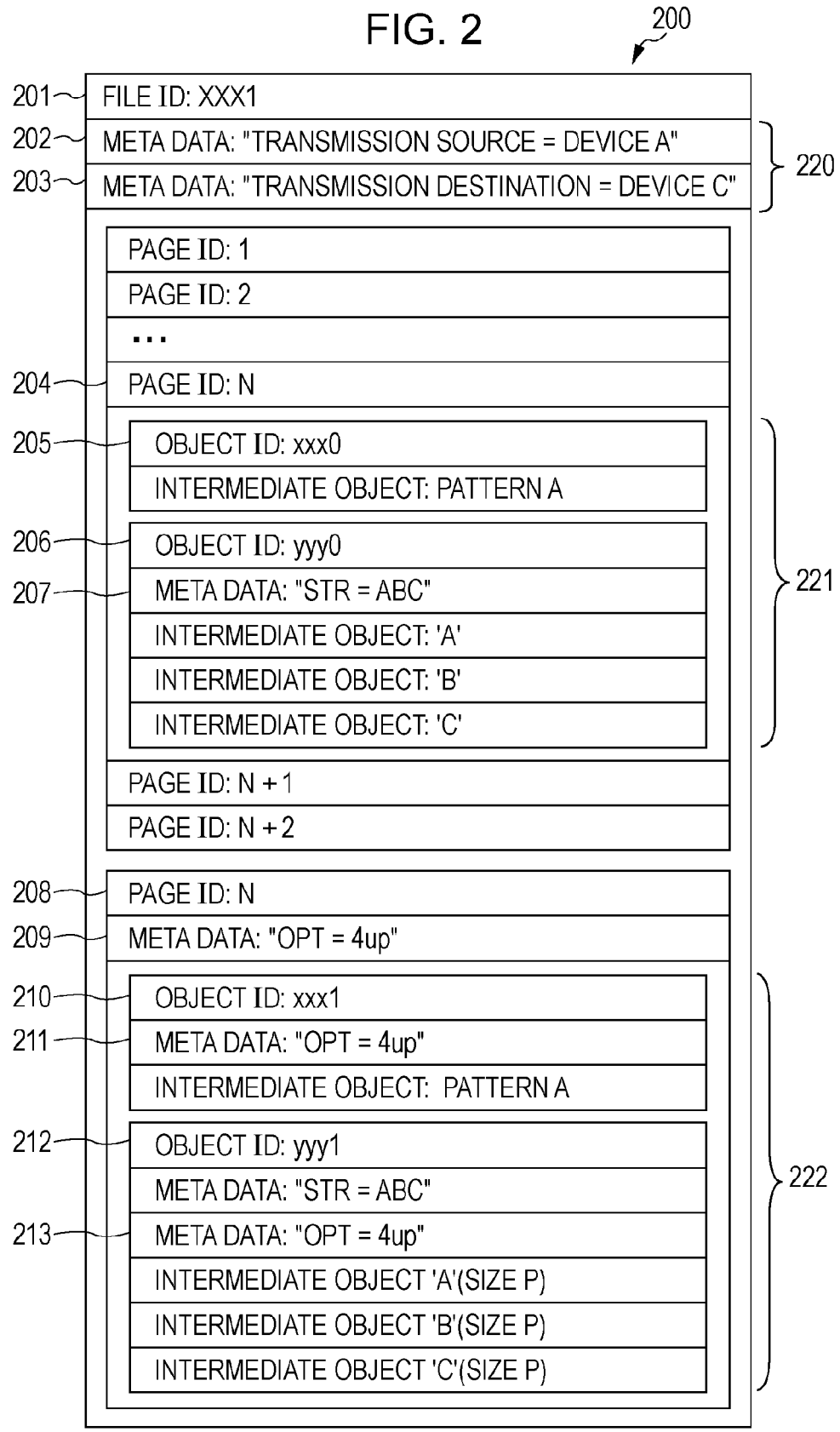
FIG. 2 conceptually shows an exemplary configuration of intermediate-file data managed by a file-management unit according to the first embodiment.

FIG. 2 is a conceptual illustration of an example configuration of intermediate-file data 200 managed by the file-management unit 114.

In FIG. 2, the intermediate-file data 200 includes file-ID data 201 used to perform management in the file-management unit 114, meta data (transmission-source information) 202 indicating the transmission source of the intermediate-file data 200, and meta data (transmission-destination information) 203 indicating the transmission destination of the intermediate-file data 200. Here, the transmission-source information 202 and/or the transmission-destination information 203 includes identification information including data on, for example, "IP address and/or host name" used to specify the information-processing apparatus 2000 and/or the image-processing apparatuses 1000 to 1002 provided on the network 4000. According to the intermediate-file data 200 shown in FIG. 2, the transmission-source information 202 and the transmission-destination information 203 are provided, as external-link information 220. The image-processing apparatuses 1000 to 1002 write at least one of the transmission-source information 202 and the transmission-destination information 203 into the intermediate-file data 200 according to the transmission source and the transmission destination of the intermediate-file data 200.

Further, the intermediate-file data 200 includes intermediate data generated in objects. The above-described intermediate data is associated with page IDs (1 to N+2). Object data 205 indicating a fill pattern and object data 206 indicating a character pattern are retained in intermediate-object data included in N-page data 204. Object data indicating individual character patterns is displayed as a character string. Therefore, meta data (character-string information) 207 is retained in the object data 206 indicating the character pattern. Consequently, the object data 206 indicating the character pattern can be processed, as a character string. According to the intermediate-file data 200 shown in FIG. 2, the object data 205 and the object data 206 are provided, as ordinary intermediate-object data 221.

Further, the intermediate-file data 200 shown in FIG. 2 includes intermediate data optimized in objects. Object data 210 is intermediate data achieved by optimizing the object data 205 indicating the fill pattern, so as to be output through 4-up printing (printing data on four logical pages on a single face of a single physical page). The object data 210 retains meta data (optimized information) 211 indicating that the object 210 is optimized object data. Similarly, object data 212 is intermediate data achieved by optimizing the object data 206 indicating the character pattern, so as to be output through the 4-up printing. The object data 212 also retains meta data (optimization information) 213 indicating that the object data 212 is optimized object data.

Here, the object data 210 retains the optimization information 211 and the object data 212 retains the optimization information 213. Therefore, each of the object data 210 and the object data 212 can be processed independently, as optimized intermediate data. Further, N-page data 208 which had been optimized retains meta data (optimization information) 209. Consequently, each of the object data 210 and the object data 212 can be processed in pages, as optimized intermediate data 222. According to the intermediate-file data 200 shown in FIG. 2, each of the object data 210 and the object data 212 is intermediate-object data optimized for print settings (outputting through 4-up printing). Thus, according to the first embodiment, print-setting information associated with the optimized intermediate data is achieved through the meta data (optimization information) 211 and the meta data (optimization information) 213.

Next, example processing performed in the above-described image-processing system will be described, where the example processing is performed by the image-processing apparatus 1000, so as to transfer intermediate-file data from the image-processing apparatus 1000 to the image-processing apparatus 1001. The intermediate-file data had been transmitted from the information-processing apparatus 2000 and stored in the file-management unit 114 of the image-processing apparatus 1000. Namely, in the first embodiment, an acquisition unit is achieved when the image-processing apparatus 1000 receives the intermediate-file data transmitted from the information-processing apparatus 2000.

FIG. 3 is a flowchart illustrating an example of processing performed by the image-processing apparatus 1000, so as to transfer the intermediate-file data to the image-processing apparatus 1001. FIG. 4 conceptually shows an exemplary configuration of intermediate-file data stored in the image-processing apparatus 1000.

In FIG. 4, file-ID data 401 included in intermediate-file data 400 is used to uniquely specify the intermediate-file data 400 on the network 4000. More specifically, the file-ID data 401 is provided as data on a value calculated by combining the network address (192.168.0.1) of the information-processing apparatus 2000 functioning as the transmission source of the intermediate-file data 400 and the serial number "1232" of file data generated in the information-processing apparatus 2000.

Further, meta data (transmission-source information) 402 indicating the transmission source of the intermediate-file data 400 includes data on the network address (192.168.0.1) of the information-processing apparatus 2000. Since the intermediate-file data 400 is newly generated file data, meta data (transmission-destination information) 403 indicating the transmission destination of the intermediate-file data 400 includes no network-address data. According to the intermediate-file data 400 shown in FIG. 4, the meta data (transmission-source information) 402 and the meta data (transmission-destination information) 403 are provided, as external-link information 411. Further, arbitrary page-N data 404 includes arbitrary intermediate-object data 405. The above-described intermediate-object data 405 is provided, as unoptimized ordinary intermediate-object data 412.

The user selects arbitrary intermediate-file data 400 stored in the file-management unit 114 by using the operation unit 102 of the image-processing apparatus 1000. Further, the user specifies the transfer destination of the intermediate-file data 400 and issues a transfer instruction by using the operation unit 102. The job-control unit 103 accepts data on a transfer job based on the above-described operations performed by the user, at step S301. Namely, the job-control unit 103 performs processing, so as to accept the intermediate-file data 400 which shall be transferred to the image-processing apparatus 1001.

FIG. 5 shows an example of a management-file-list-operation-screen image 1010 displayed on the operation unit 102 of the image-processing apparatus 1000. The user performs operations by using the management-file-list-operation-screen image 1010, so as to select the intermediate-file data 400, for example. Here, the management-file-list-operation-screen image 1010 is displayed on the touch panel of the operation unit 102.

In FIG. 5, a management-file-list-display part 1011 and a button 1012 are displayed on the management-file-list-operation-screen image 1010. The management-file-list-display part 1011 is provided to display the list of intermediate-file-data items 400 so that the user can select an intermediate-file-data item 400 that shall be transferred and/or printed from among data items shown on the list.

The button 1012 is pressed by the user, so as to execute an instruction issued for the selected intermediate-file-data item 400. The user can select printing, transferring, and deleting the intermediate-file data 400. The result of the selection made by the user affects what is displayed in each of check boxes 1013, 1014, and 1015. That is to say, the user can select an instruction issued for the intermediate-file-file-data item 400 by selecting at least one of the check boxes 1013 to 1015.

File-ID data 1016, document-name data 1017, number-of-pages data 1018 included in an intermediate-file-data item, and information indicating the date and time when the intermediate-file-data item is stored, as the intermediate-file-data item 400 (the storage date and time) 1019, are displayed on the management-file-list-display part 1011. The user selects arbitrary intermediate-file-data item 400 (file ID=192-168-0-1-1232 in the first embodiment) stored in the file-management unit 114 from the management-file-list-display part 1011.

Next, the file-management unit 114 replicates intermediate-file-data item 400 which is selected by the user for transfer, at step S302.

Figure 6:
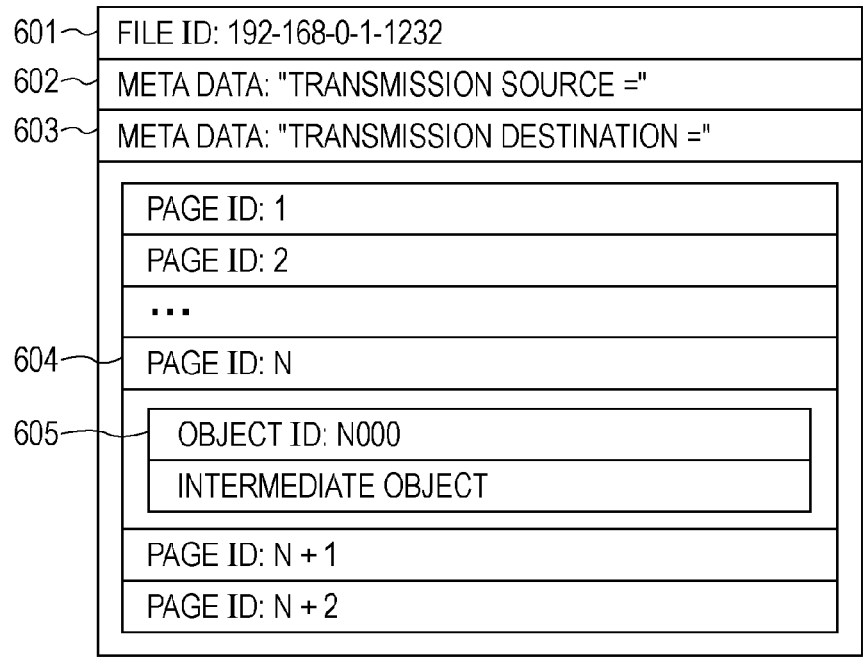
FIG. 6 conceptually shows an exemplary configuration of an intermediate-file-data item replicated for transfer according to the first embodiment.

FIG. 6 conceptually shows an exemplary configuration of an intermediate-file-data item replicated for transfer. In FIG. 6, data on a file ID 601 of intermediate-file-data item 600 is identical with the file-ID data 401 which is the replication source. The meta data (transmission-source information) 402 indicating the transmission source of the intermediate-file data 400 and network data included in the meta data (transmission-destination information) 403 indicating the transmission destination of the intermediate-file data 400 are deleted. Therefore, no network-address data is included in each of meta data (transmission-source information) 602 showing the transmission source of the intermediate-file-data item 600 and meta data (transmission-destination information) 603 showing the transmission destination of the intermediate-file-data item 600. Further, arbitrary intermediate-object data 605 included in arbitrary page-N data 604 is identical with the intermediate-object data 405 which is the replication source.

Next, at step S303, the job-control unit 103 instructs the I/F unit 101 to transfer the intermediate-file-data item 600 replicated at step S302. Consequently, the replicated intermediate-file-data item 600 is transferred to the image-processing apparatus 1001. Thus, in the first embodiment, an output unit configured to output intermediate-file data to the image-processing apparatus 1001, which is provided as an exemplary external apparatus, is achieved through the processing performed at step S303. Next, the meta-data-generation unit 113 updates data included in the intermediate-file data 400 which is the replication source, at step S304.

Figure 7:
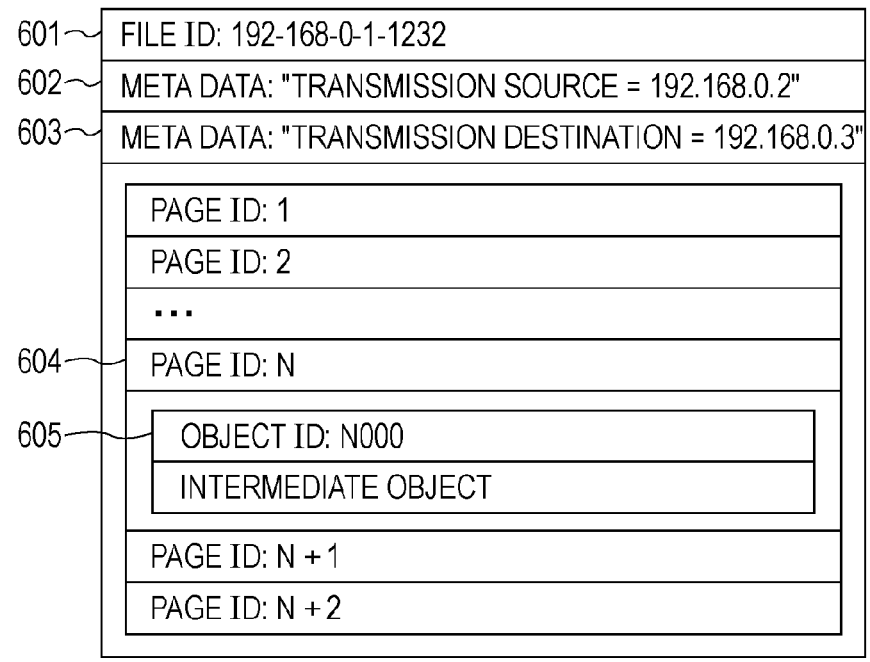
FIG. 7 conceptually shows an exemplary configuration of intermediate-file data updated by the image-processing apparatus according to the first embodiment.

FIG. 7 conceptually shows an exemplary configuration of the intermediate-file data 400 updated by the image-processing apparatus 1000.

In FIG. 7, data on the network address (192.168.0.2) of the image-processing apparatus 1000 is written into the meta data (transmission-source information) 602 showing the transmission source of the intermediate-file data 400. On the other hand, data on the network address (192.168.0.3) of the image-processing apparatus 1001, which is transmission-destination data transmitted from the operation unit 102, is retained in (written into) the meta data (the transmission-destination information) 603 showing the transmission destination.

Figure 8:
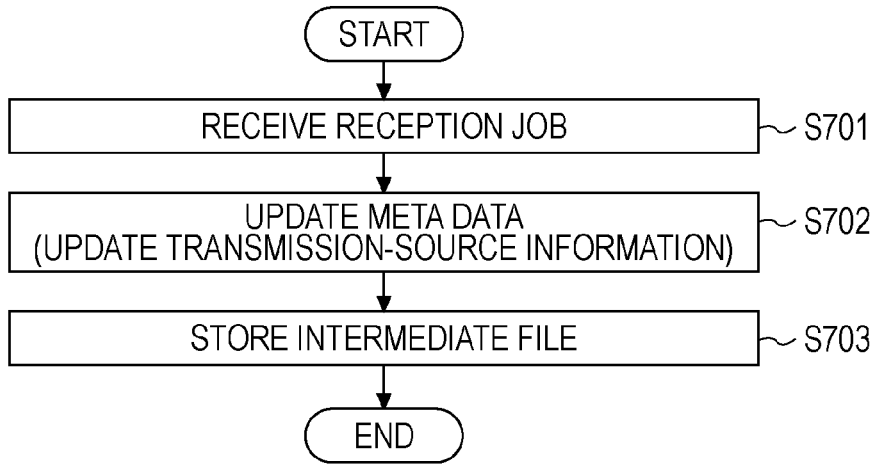
FIG. 8 is a flowchart illustrating an example of a processing performed by the image-processing apparatus, so as to receive intermediate-file data transferred from another image-processing apparatus, according to the first embodiment.

Next, an example of processing performed by the image-processing apparatus 1001, so as to receive the intermediate-file data 600 that is transferred from the image-processing apparatus 1000 and that is shown in FIG. 7, will be described with reference to a flowchart of FIG. 8.

First, the I/F unit 101 of the image-processing apparatus 1001 detects reception of the intermediate-file data 600 transferred from the image-processing apparatus 1000, and the job-control unit 103 accepts data on a reception job, at step S701. Thus, in the first embodiment, a second acquisition unit configured to acquire intermediate-file data transmitted from the image-processing apparatus 1000, which is provided as an exemplary external apparatus, is achieved through the processing performed at step S701, for example. Next, the meta-data-generation unit 113 of the image-processing apparatus 1001 updates the received intermediate-file data 600, at step S702.

Figure 9:
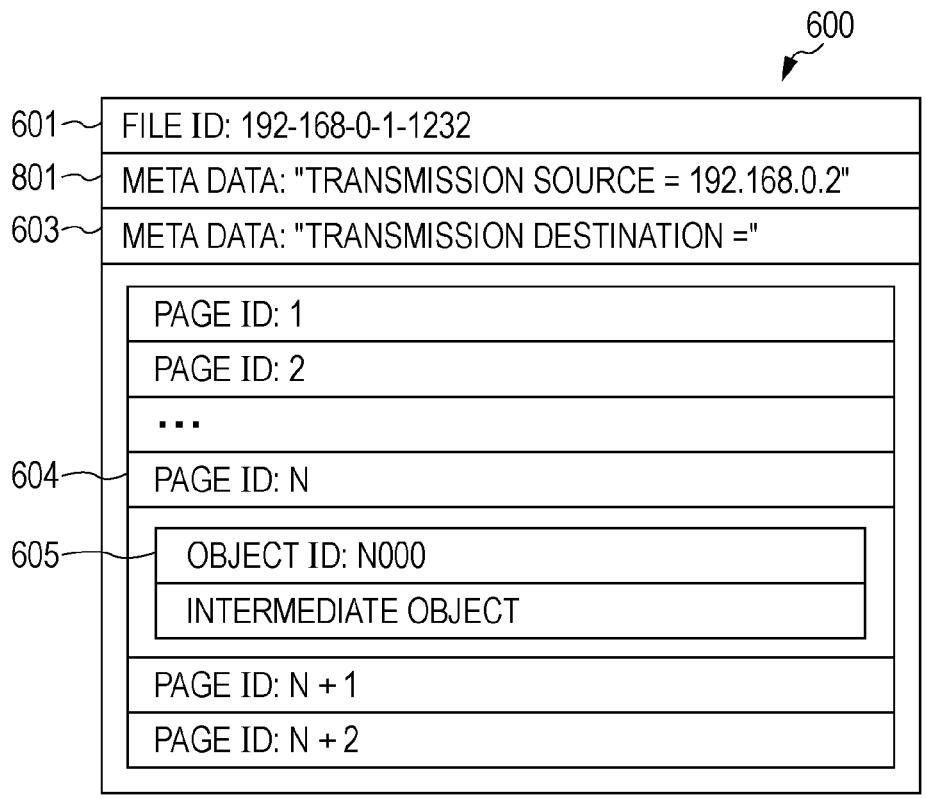
FIG. 9 conceptually shows an exemplary configuration of intermediate-file data updated by the image-processing apparatus according to the first embodiment.

FIG. 9 conceptually shows an example configuration of the intermediate-file data 600 updated by the image-processing apparatus 1001, at step S702. Since the image-processing apparatus 1001 does not transmit the intermediate-file data 600, at that stage, meta data indicating the transmission destination is deleted. As a result, the image-processing apparatus 1001 can recognize that the intermediate-file data 600 is transmitted and/or not transmitted from the image-processing apparatus 1000(801) by referring to FIG. 9. Thus, in the first embodiment, a write unit is achieved through the processing performed at step S702, for example.

Returning to FIG. 8, at step S703, the file-management unit 114 of the image-processing apparatus 1001 stores the intermediate-file data 600 updated at step S702.

Figure 10:
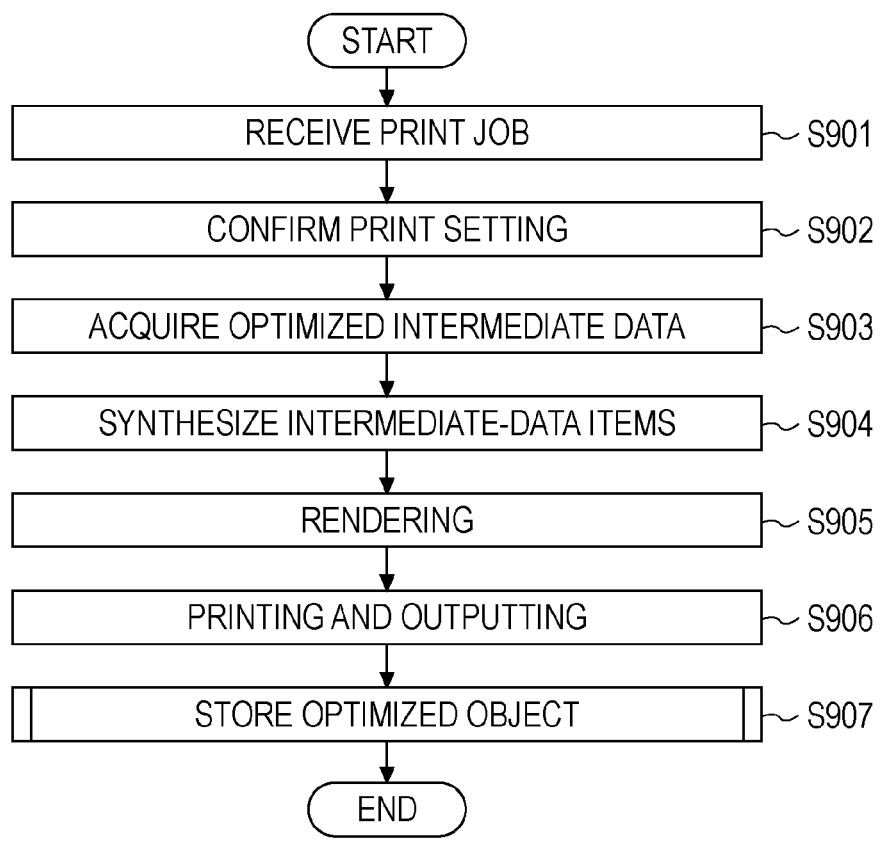
FIG. 10 is a flowchart illustrating an example of a processing performed by the image-processing apparatus, so as to print and output intermediate-file data stored in the file-management unit or the like, according to the first embodiment.

Next, an example of processing performed by the image-processing apparatus 1000, so as to print and output the intermediate-file data 400 stored in the file-management unit 114 or the like, will be described with reference to a flowchart of FIG. 10.

First, the job-control unit 103 accepts data on a print job, at step S901. Namely, the job-control unit 103 performs processing, so as to accept the intermediate-file data 400 for printing and outputting.

The user selects arbitrary intermediate-file data 400 stored in the file-management unit 114 by operating the operation unit 102 of the image-processing apparatus 1000. More specifically, the user presses the check box 1013 corresponding to the above-described arbitrary intermediate-file data 400, the check box 1013 being shown in the management-file-list-display part 1011 shown in FIG. 5, and determines to print and output the above-described arbitrary intermediate-file data 400. Then, the user presses the button 1012, so as to issue an instruction to print and output the above-described arbitrary intermediate-file data 400.

Here, the user selects the arbitrary intermediate-file data 400 (file ID=192-168-0-1-1232 in the first embodiment) stored in the file-management unit 114 from among file data displayed on the management-file-list-display part 1011 shown in FIG. 5. At that time, the user specifies settings on printing and outputting of the selected intermediate-file data 400. For example, 4-up printing is specified, as the settings on printing and outputting.

Next, the job-attribute-analysis unit 105 confirms the specified settings on printing and outputting, at step S902. Thus, in the first embodiment, an input unit is achieved through the processing performed at steps S901 and S902.

Next, the job-control unit 103 acquires intermediate data which is the most appropriate to be output according to the printing-and-outputting settings specified by the user (intermediate data optimized for the printing-and-outputting settings specified by the user) via the I/F unit 101, at step S903. The above-described optimized intermediate data is generated in objects. In the following description, the optimized intermediate data is referred to as optimized object-data items. Thus, in the first embodiment, an acquisition unit is achieved through the processing performed at step S903, for example.

Next, at step S904, the intermediate-data-synthesis unit 112 combines plural intermediate-data items including the optimized object-data items acquired at step S903. The combined intermediate-data items are temporarily stored in the intermediate-data-accumulation unit 107. Details on the combined intermediate-data items will be described later.

Next, the data-drawing unit 108 performs rendering processing, so as to convert the intermediate-data items temporarily stored in the intermediate-data-accumulation unit 107 into bitmap data generated in pages, at step S905.

Next, the output-control unit 109 converts the bitmap data generated in pages into a video signal, the bitmap data being generated at step S905. Then, the output-control unit 109 performs image-transfer processing, so as to transfer the video signal, in synchronization with the image-forming processing and the paper-feed processing that are performed by the print unit 104. The print unit 104 forms an image based on the transferred video signal, and prints and outputs the image, at step S906. Thus, according to the first embodiment, a print-processing-execution unit is achieved through the processing procedures performed at steps S904 to S906.

Next, the file-management unit 114 stores the optimized object-data items, at step S907.

Figure 11:
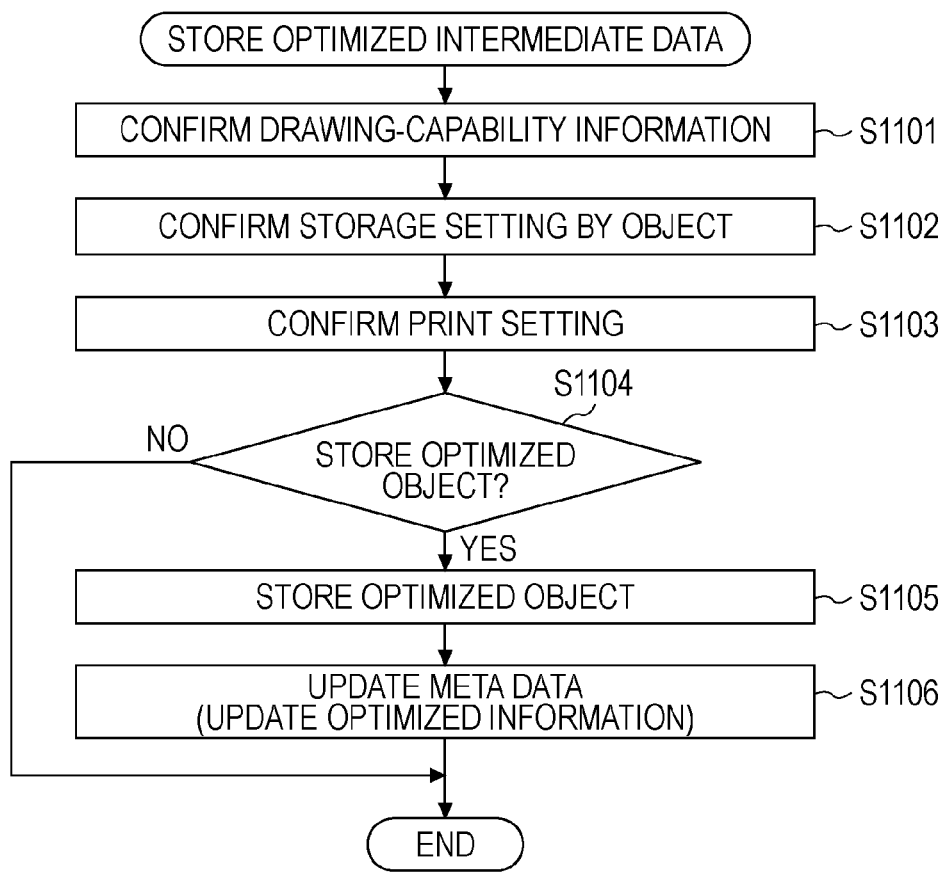
FIG. 11 is a flowchart showing details on processing performed to store optimized object data at a step shown in FIG. 10 according to the first embodiment.

Here, details on processing performed at step S907 shown in FIG. 10, so as to store the optimized object-data items, will be described with reference to a flowchart of FIG. 11. At least one of the optimized object-data items is included in the intermediate-file data 400. First, the capability-information-management unit 110 confirms information about the drawing capability of the image-processing apparatus 1000, at step S1101.

FIG. 12 shows an example of a drawing-capability-information-management table 1200 managed by the capability-information-management unit 110 of the image-processing apparatus 1000.

A font scaler 1203 used for a scalable font generated in a TrueType format and a font scaler 1204 used for a scalable font generated in a Type1 format are set, as drawing-capability-information items 1201, on the drawing-capability-information-management table 1200 shown in FIG. 12. Further, a hardware decoder 1205 used for image data compressed in a joint-photographic-experts-group (JPEG) format and a hardware decoder 1206 used for image data compressed in a run-length format are set on the drawing-capability-information-management table 1200. Still further, data on the size 1207 of an area used to store data on registration patterns is set on the drawing-capability-information-management table 1200.

Further, storage-propriety-flag data 1202 is defined on the drawing-capability-information-management table 1200, so as to identity whether optimized object data should be stored for each of the above-described drawing-capability-information items 1201.

Here, the sign "○ (storable)" is set, as the value of the storage-propriety-flag data 1202, for object data requiring hardware specifically designed to generate optimized object data and/or object data which only uses a memory size falling within specifications made to store the optimized object data. On the other hand, the sign "x (unstorable)" is set, as the value of the storage-propriety-flag data 1202, for object data requiring no hardware specifically designed to generate optimized object data and/or object data which uses a memory size higher than the specifications made to store the optimized object data.

Returning to FIG. 11, the capability-information-management unit 110 confirms "storage settings by object" of the image-processing apparatus 1000, at step S1102.

Here, FIG. 13 shows an example of a storage-setting-by-object-management table 1300 managed by the capability-information-management unit 110 of the image-processing apparatus 1000.

In FIG. 13, data on the types of fonts (bitmap font 1303 and scalable font 1304) used for text-object data is set, as object-format data 1301. Further, data on the color types (color 1305 and monochrome 1306) of image-object data and data on filling types (solid-fill 1307, incorporated pattern 1308, and registered pattern 1309) of graphic-object data are set, as the object-format data 1301. Further, storage-propriety-flag data 1302 is set on the storage-setting-by-object-management table 1300, so as to identity whether optimized object data should be stored for each of the above-described data items of the object-format data 1301.

The sign "○ (storable)" is set, as the value of the storage-propriety-flag data 1302, for object data that can be processed with increased speed by using optimized object data. On the other hand, the sign "x (unstorable)" is set, as the value of the storage-propriety-flag data 1302, for object data processed with speed of which decrease rate is low even though ordinary object data is used.

Thus, in the first embodiment, the capability-information-management unit 110 managing the drawing-capability-information-management table 1200 and the storage-setting-by-object-management table 1300 achieves a second storage unit configured to store processing-capability information in a storage medium, for example.

Returning to FIG. 11, the capability-information-management unit 110 confirms print settings specified for optimized object data for storing, at step S1103. Here, the print settings specified for the optimized object data indicate outputting performed through 4-up printing.

Next, the capability-information-management unit 110 determines whether processing should be performed, the processing being performed to store the optimized object data, based on the set values of the storage-propriety-flag data 1202 and the storage-propriety-flag data 1302, and the type of the optimized object, at step S1104. Thus, in the first embodiment, a determining unit is achieved through the processing performed at step S1104.

If the determination result indicates that the optimized object data should not be stored, the processing is finished. On the other hand, if the optimized object data should be stored, the file-management unit 114 stores the optimized object data, at step S1105.

Next, the meta-data-generation unit 113 updates meta data included in the optimized object data stored in the file-management unit 114, at step S1106.

Figure 14:
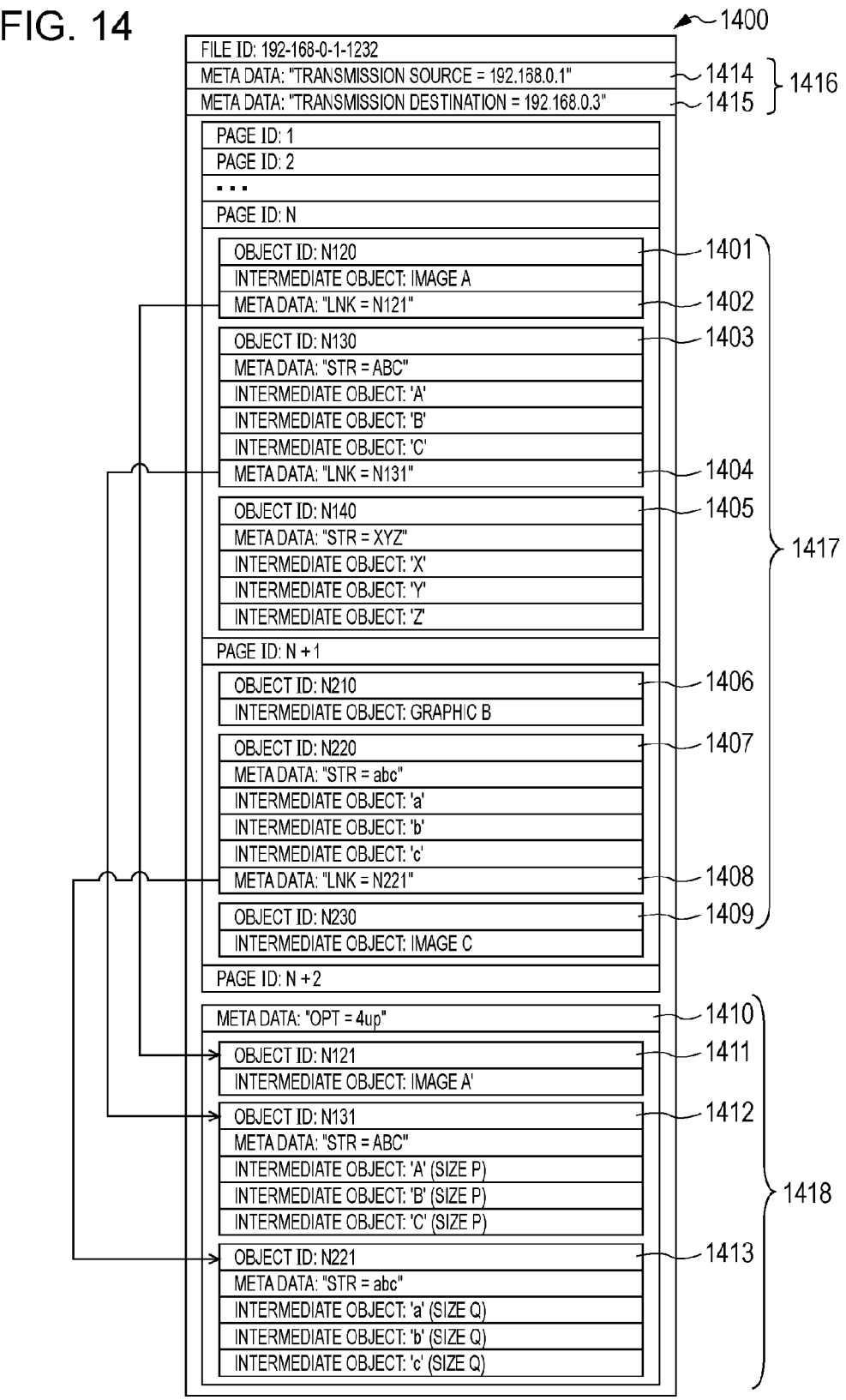
FIG. 14 conceptually shows an exemplary configuration of intermediate-file data retaining optimized object data according to the first embodiment.

FIG. 14 conceptually shows an exemplary configuration of intermediate-file data 1400 retaining the optimized object data.

According to the intermediate-file data 1400 shown in FIG. 4, meta data (transmission-source information) 1414 showing the transmission source of the intermediate-file data 1400 and meta data (transmission-destination information) 1415 showing the transmission destination of the intermediate-file data 1400 are provided, as external-link information 1416.

Object data identified by object-ID data (=N120) 1401 is color-image-object data compressed in the JPEG format. Therefore, the color-image-object data is stored as optimized object data based on the drawing-capability-information-management table 1200 shown in FIG. 12 and the storage-setting-by-object-management table 1300 shown in FIG. 13 (that is, Yes at step S1104 shown in FIG. 11). More specifically, the color-image-object data is stored in an optimized-object-storage area 1410 of the intermediate-file data 1400, as optimized object data identified by object-ID (=N121) data 1411.

Here, optimization information indicating that the color-image-object data is optimized to be output through 4-up printing is added in the optimized-object-storage area 1410, as meta data. Further, meta data (internal-link information) 1402 indicating an internal link to the object-ID data 1411 is added to the object-ID (=N120) data 1401.

Further, in FIG. 14, object data identified by object-ID (=N130) data 1403 is text-object data using a scalable font generated in the TrueType format. Therefore, the text-object data is stored as optimized object data based on the drawing-capability-information-management table 1200 shown in FIG. 12 and the storage-setting-by-object-management table 1300 shown in FIG. 13. Then, the text-object data is stored in the optimized-object-storage area 1410 of the intermediate-file data 1400, as optimized object data identified by object-ID (=N131) data 1412. More specifically, meta data (internal-link information) 1404 indicating an internal link to the object-ID data 1412 is added to the object-ID (=N130) data 1403.

Further, in FIG. 14, object data identified by object-ID (=N140) data 1405 is text-object data using a bitmap font. Therefore, the text-object data is not stored as optimized object data according to the drawing-capability-information-management table 1200 shown in FIG. 12 and the storage-setting-by-object-management table 1300 shown in FIG. 13. Consequently, as indicated by FIG. 14, optimized object data obtained by optimizing object data identified by the object-ID (=N140) data 1405 for print settings (outputting through 4-up printing) is not retained in the intermediate-file data 1400.

Further, in FIG. 14, object data identified by object-ID (=N210) data 1406 is graphic-object data using incorporated pattern data. Therefore, the graphic-object data is not stored as optimized object data based on the drawing-capability-information-management table 1200 shown in FIG. 12 and the storage-setting-by-object-management table 1300 shown in FIG. 13. Consequently, as indicated by FIG. 14, optimized object data obtained by optimizing object data identified by the object-ID (=N210) data 1406 for print settings (outputting through 4-up printing) is not retained in the intermediate-file data 1400.

Further, in FIG. 14, object data identified by object-ID (=N220) data 1407 is text-object data using a scalable font generated in the TrueType format. Therefore, the text-object data is stored as optimized object data based on the drawing-capability-information-management table 1200 shown in FIG. 12 and the storage-setting-by-object-management table 1300 shown in FIG. 13. Then, the text-object data is stored in the optimized-object-storage area 1410 of the intermediate-file data 1400, as optimized object data identified by object-ID (=N221) data 1413. Then, meta data (internal-link information) 1408 indicating an internal link to the object-ID data 1413 is added to the object-ID (=N220) data 1407.

Further, in FIG. 14, object data identified by object-ID (=N230) data 1409 is color-image-object data compressed in the run-length format. Therefore, the color-image-object data is not stored as optimized object data based on the drawing-capability-information-management table 1200 shown in FIG. 12 and the storage-setting-by-object-management table 1300 shown in FIG. 13. Consequently, as shown in FIG. 14, optimized object data obtained by optimizing object data identified by the object-ID (=N230) data 1409 for print settings (outputting through 4-up printing) is not retained in the intermediate-file data 1400.

Thus, according to the intermediate-file data 1400 shown in FIG. 14, object data identified by the object-ID data 1401, the object-ID data 1403, the object-ID data 1405, the object-ID data 1406, the object-ID data 1407, and the object-ID data 1409 is provided, as ordinary object data 1417. Further, optimized object data identified by the object-ID data 1411, the object-ID data 1412, and the object-ID data 1413 is provided, as intermediate-object data (intermediate data) 1418 optimized for the print settings (outputting through 4-up printing). Thus, in the first embodiment, a storage unit is achieved through the processing procedures performed at steps S1105 and S1106.

Next, example processing performed by the image-processing apparatus 1002, so as to acquire optimized object data from the image-processing apparatus 1000, will be described with reference to a flowchart of FIG. 15. Further, the user selects intermediate-file data for printing by using an operation panel of the image-processing apparatus 1002, and specifies print-setting information for the selected intermediate-file data. Here, the user selects intermediate-file data corresponding to the file ID 192-168-0-1-1232, as file data for printing, and specifies data on 4-up printing, as print-setting information for the intermediate-file data.

First, the capability-information-management unit 110 confirms information about the drawing capability of the image-processing apparatus 1002, at step S1501.

FIG. 16 shows an example drawing-capability-information-management table 1600 managed by the capability-information-management unit 110 of the image-processing apparatus 1002.

A font scaler 1603 used for a scalable font generated in the TrueType format and a font scaler 1604 used for a scalable font generated in the Type1 format are set as drawing-capability-information items 1601 on the drawing-capability-information-management table 1600 shown in FIG. 16. Further, a hardware decoder 1605 used for image data compressed in the JPEG format and a hardware decoder 1606 used for image data compressed in the run-length format are set on the drawing-capability-information-management table 1600, as the drawing-capability-information items 1601. Still further, data on a size 1607 of an area used to store data on registration patterns is set on the drawing-capability-information-management table 1600, as the drawing-capability-information item 1601.

Further, storage-propriety-flag data 1602 is defined on the drawing-capability-information-management table 1600, so as to identify whether or not optimized object data should be stored for each of the above-described drawing-capability-information items 1601.

Here, the sign "○ (storable)" is set, as the value of the storage-propriety-flag data 1602, for object data requiring hardware specifically designed to generate optimized object data and/or object data which only uses a memory size falling within specifications made to store the optimized object data. On the other hand, the sign "x (unstorable)" is set, as the value of the storage-propriety-flag data 1602, for object data requiring no hardware specifically designed to generate optimized object data and/or object data which uses a memory size higher than the specifications made to store the optimized object data.

Returning to FIG. 15, the capability-information-management unit 110 confirms "storage settings by object" on which data is stored in the image-processing apparatus 1002, at step S1502.

Here, FIG. 17 shows an example storage-setting-by-object-management table 1700 managed by the capability-information-management unit 110 of the image-processing apparatus 1002.

In FIG. 17, data on the types of fonts (bitmap font 1703 and scalable font 1704) used for text-object data is set, as object-format data 1701. Further, data on the color types (color 1705 and monochrome 1706) of image-object data and data on filling types (solid-fill 1707, incorporated pattern 1708, and registered pattern 1709) of graphic-object data are set, as the object-format data 1701. Further, storage-propriety-flag data 1702 is set on the storage-setting-by-object-management table 1700, so as to identify whether optimized object data should be stored for each of the above-described data items of the object-format data 1701.

The sign "○ (storable)" is set, as the value of the storage-propriety-flag data 1702, for object data that can be processed with increased speed by using optimized object data. On the other hand, the sign "x (unstorable)" is set, as the value of the storage-propriety-flag data 1702, for object data processed with speed of which decrease rate is low even though ordinary object data is used.

Returning to FIG. 15, the meta-data-analysis unit 111 searches meta data included in the intermediate-file data stored in the file-management unit 114 of the image-processing apparatus 1002 for the optimized object data based on the set values of the storage-propriety-flag data 1602 and the storage-propriety-flag data 1702, at step S1503.

Here, it is clear that no optimization information is retained in intermediate-file data for each of object data for which the sign "x" is set as the value of the storage-propriety-flag data 1602 on the drawing-capability-information-management table 1600, and object data for which the sign "x" is set as the value of the storage-propriety-flag data 1702 on the storage-setting-by-object-management table 1700. Therefore, when the type of object data for which the sign "x" is set as the value of each of the storage-propriety-flag data 1602 and the storage-propriety-flag data 1702, the meta-data-analysis unit 111 skips analyzing meta data about the object data, so that a search for the optimization information can be made with increased speed.

Next, at step S1504, the meta-data-analysis unit 111 temporarily determines optimized object data for use based on a result of the meta-data search made at step S1503.

Figure 18:
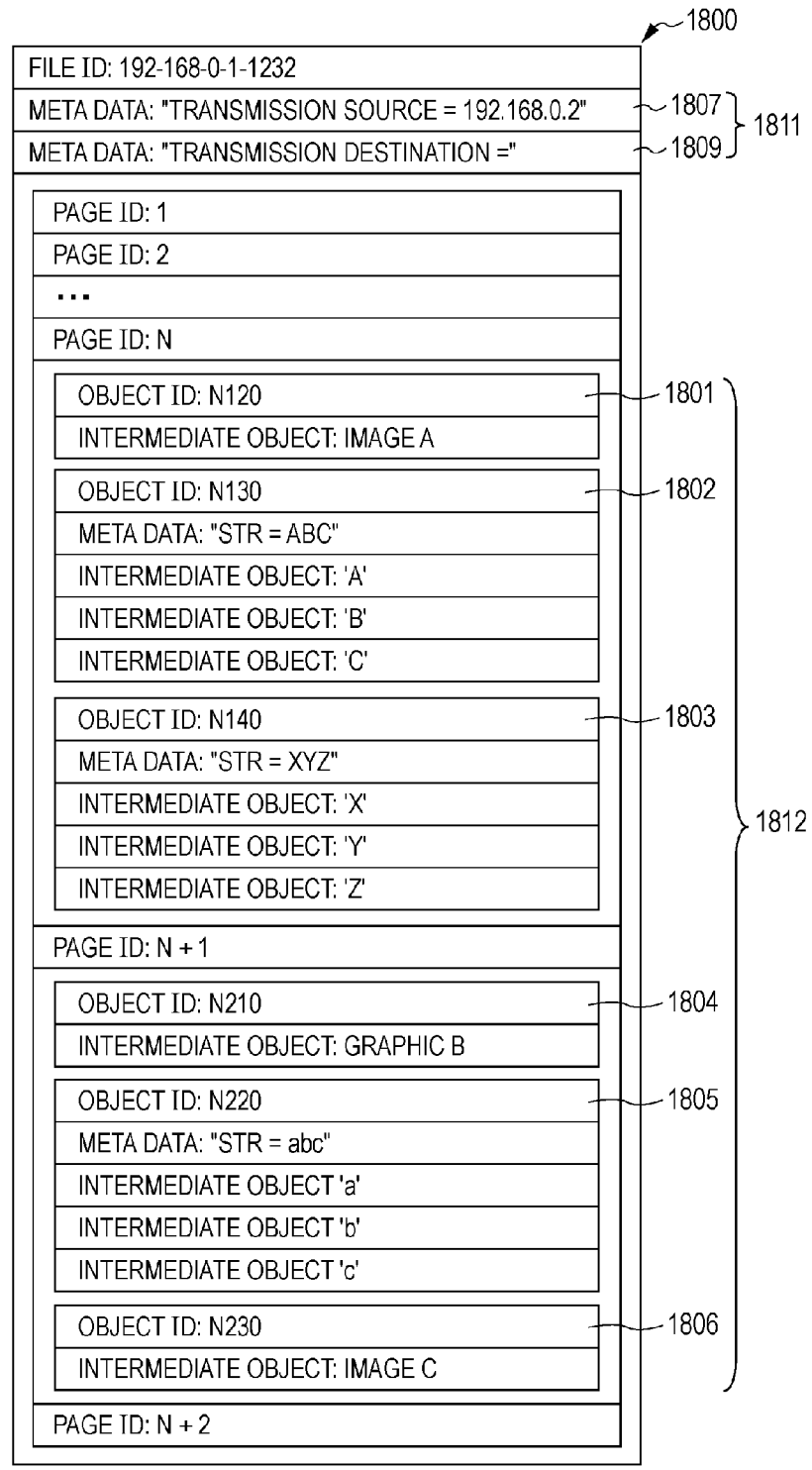
FIG. 18 conceptually shows an exemplary configuration of intermediate-file data that is transferred from another image-processing apparatus and that is stored in the file-management unit of the image-processing apparatus according to the first embodiment.

FIG. 18 conceptually shows an exemplary configuration of intermediate-file data that is transferred from the image-processing apparatus 1000 functioning as the transmission source and that is stored in the file-management unit 114 of the image-processing apparatus 1002 functioning as the transmission destination. Here, the transfer of the intermediate-file data is achieved by performing the above-described processing procedures shown in FIG. 3.

According to intermediate-file data 1800 shown in FIG. 18, meta data (transmission-source information) 1807 indicating the transmission source of the intermediate-file data 1800, and meta data (transmission-destination information) 1809 indicating the transmission destination of the intermediate-file data 1800 are provided as external-link information 1811.

Further, object data identified by object-ID (=N120) data 1801 is color-image-object data compressed in the JPEG format, and optimized object data is not yet generated.

Further, object data identified by object-ID (=N130) data 1802 is text-object data using a scalable font generated in the TrueType format, and optimized object data is not yet generated.

Further, object data identified by object-ID (=N140) data 1803 is text-object data using a bitmap font, and optimized object data is not yet generated.

Further, object data identified by object-ID (=N210) data 1804 is graphic-object data using incorporated pattern data, and optimized object data is not yet generated.

Further, object data identified by object-ID (=N220) data 1805 is text-object data using the scalable font generated in the TrueType format, and optimized object data is not yet generated.

Further, object data identified by object-ID (=N230) data 1806 is monochrome-image-object data compressed in the run-length format, and optimized object data is not yet generated.

Thus, according to the intermediate-file data 1800 shown in FIG. 18, object data identified by the object-ID data 1801, the object-ID data 1802, the object-ID data 1803, the object-ID data 1804, and the object-ID data 1806 is provided as ordinary object data 1812. Further, the intermediate-file data 1800 includes no intermediate-object data optimized for the print settings (outputting through 4-up printing). Consequently, when the processing corresponding to step S1503 is performed for the intermediate-file data 1800 shown in FIG. 18, optimized object data for use is not searched.

Next, the meta-data-analysis unit 111 determines whether an inquiry (acquisition) about meta data (optimization information) included in intermediate-file data stored in another image-processing apparatus should be made based on the set values of the storage-propriety-flag data 1602 and the storage-propriety-flag data 1702, at step S1505. If the determination result shows that no inquiry about the meta data (optimization information) should be made, the processing advances to step S1514 that will be described later. On the other hand, if the inquiry about the meta data (optimization information) should be made, the meta-data-analysis unit 111 confirms link information from the meta data included in the intermediate-file data 1800, at step S1506.

Next, the meta-data-analysis unit 111 determines whether the inquiry destination of the meta data (optimization information) exists outside based on the result of the link-information confirmation, at step S1507. According to the intermediate-file data 1800 shown in FIG. 18, the image-processing apparatus 1000 functions as the inquiry destination according to the network address (192.168.0.2) indicated by the meta data (transmission-source information).

If the determination result shows that the inquiry destination of the meta data (optimization information) does not exist outside the system, the processing advances to step S1514 which will be described later. On the other hand, if the inquiry destination of the meta data (optimization information) exists outside the system, the job-control unit 103 inquires about the meta data (optimization information) via the I/F unit 101, at step S1508.

FIG. 19 conceptually shows an example of meta-data-inquiry packet 1900 transmitted when an inquiry about meta data (optimization information) is made to another image-processing apparatus. In FIG. 19, the meta-data-inquiry packet 1900 includes an object-information part 1901 and an optimization-information part 1902. In the object-information part 1901, object-ID data items 1903, 1904, 1905, 1906, 1907, 1908, 1909, and 1910 are set for object-data items. Further, data on the type of optimization information necessary for each of the object-ID data items 1903 to 1910 is set.

Returning to FIG. 15, the meta-data-analysis unit 111 determines whether the meta data (optimization information) was acquired, at step S1509.

FIG. 20 conceptually shows an example meta-data-return packet 2010 of target-file data which is the same as print-target-file data specified to be printed, the meta-data-return packet being returned from another image-processing apparatus. In FIG. 20, the meta-data-return packet 2010 includes an original-object-information part 2011, an optimized-object-information part 2012, and an optimization-information part 2013. Further, object-ID data items 2014, 2015, 2016, 2017, and 2018 of object-data items are set in each of an original-object-information part 2011 and an optimized-object-information part 2012. Further, data on the type of optimization information is set for each of the object-ID-data items 2014 to 2018.

If the determination result shows that no meta data (optimization information) is acquired, the processing returns to step S1506. On the other hand, if the meta data (optimization information) is acquired, the meta-data-analysis unit 111 determines whether there is an optimized object-data item that can be acquired from the meta-data-return packet 2010, at step S1510. If the determination result shows that there is no acquirable optimized object-data item, the processing advances to step S1514 that will be described later.

On the other hand, if there is the acquirable optimized object-data item, the meta-data-analysis unit 111 determines the optimized object-data item to be an optimized object-data item for acquisition, at step S1511.

Next, the job-attribute-analysis unit 105 issues a request to transfer the optimized object-data item via the I/F unit 101, at step S1512. Thus, in the first embodiment, an accepting unit is achieved by the image-processing apparatus 1000 receiving the transfer request (a request for acquiring the optimized object) issued through the processing corresponding to step S1512, for example.

Next, the job-attribute-analysis unit 105 determines whether the optimized object-data item was acquired, at step S1513. If the determination result shows that no optimized object-data item was acquired, the processing returns to step S1506.

On the other hand, if the optimized object-data item was acquired, the meta-data-analysis unit 111 updates data on the "optimized object data-item for use" temporarily determined at step S1504, at step S1514. Thus, in the first embodiment, a return unit is achieved by, for example, the image-processing apparatus 1000 transmitting the optimized object-data items acquired at step S1513, for example.

Figure 15:
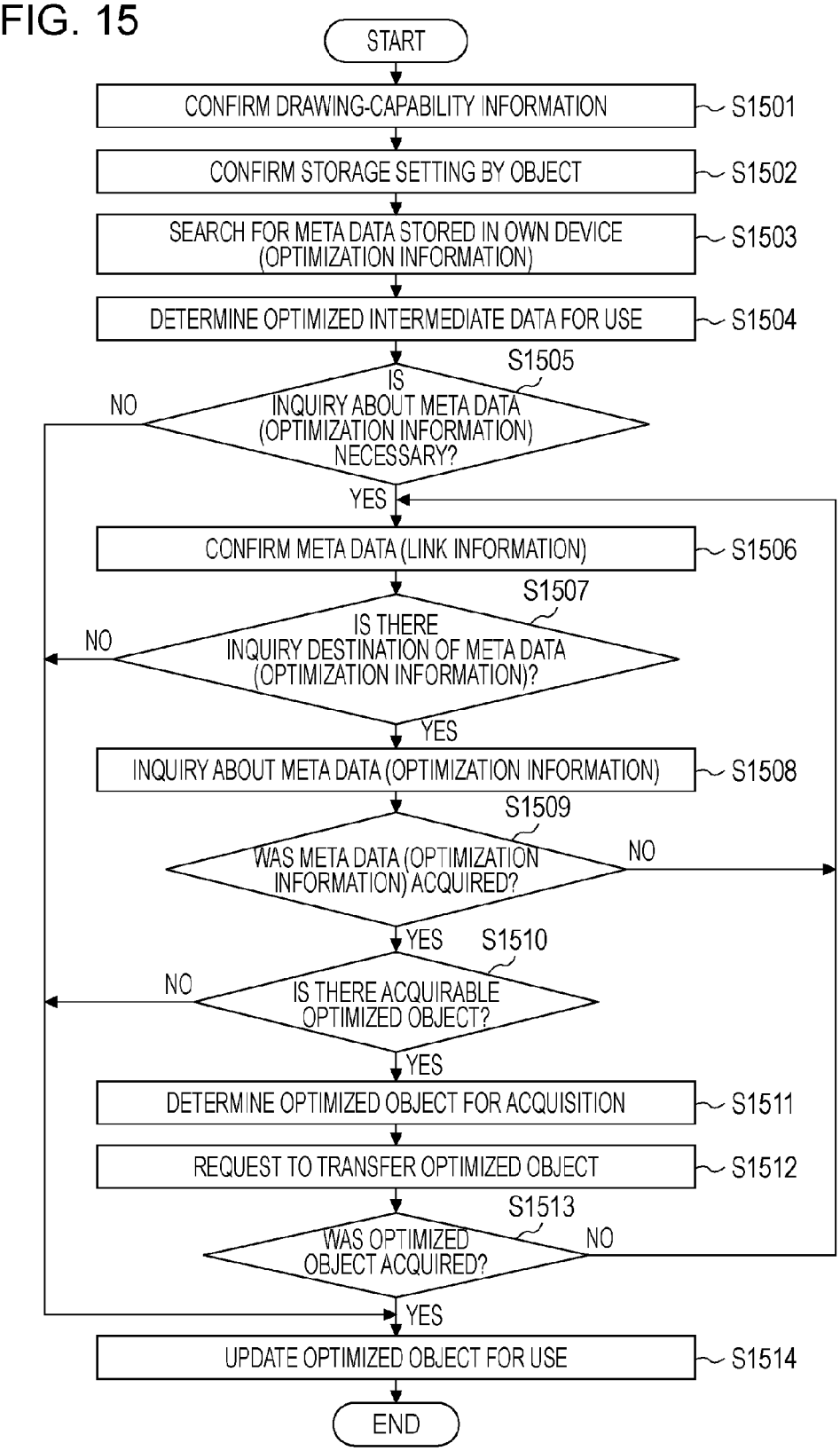
FIG. 15 is a flowchart showing an example of a processing performed by the image-processing apparatus, so as to acquire optimized object data from another image-processing apparatus according to the first embodiment.

Further, the processing corresponding to step S903 shown in FIG. 9 is achieved by the image-processing apparatus 1000 performing the same processing procedures as those shown in FIG. 15.

Figure 21:
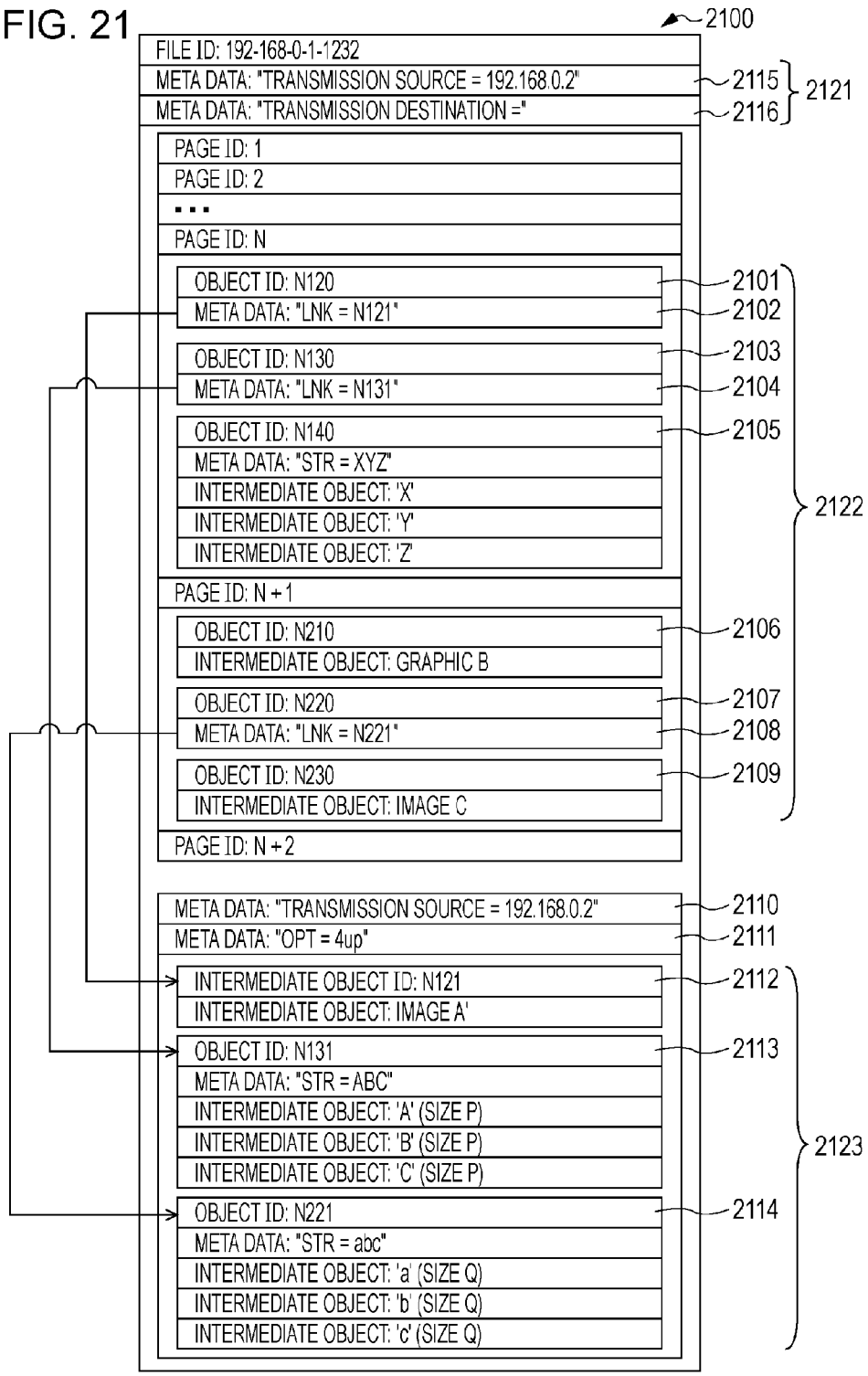
FIG. 21 conceptually shows an exemplary configuration of intermediate-file data including a combination of optimized object-data items according to the first embodiment.

FIG. 21 conceptually shows an exemplary configuration of intermediate-file data 2100 including a combination of the optimized object-data items acquired at step S1513. According to the intermediate-file data 2100 shown in FIG. 21, meta data (transmission-source information) 2115 indicating the transmission source of the intermediate-file data 2100 and meta data (transmission-destination information) 2116 indicating the transmission destination of the intermediate-file data 2100 are provided, as external-link information 2121.

Further, according to object-ID (=N120) data 2101, only internal-link information is retained as meta data 2102, so as to use data 2112 on the ID (=N121) of the acquired optimized object-data item. Further, according to object-ID (=N130) data 2103, only internal-link information is retained as meta data 2104, so as to use data 2113 on the ID (=N131) of the acquired optimized object-data item.

Further, according to object-ID (=N140) data 2105, ordinary intermediate object data is retained, since no optimized object-data item was acquired. Further, according to object-ID (=N210) data 2106, ordinary intermediate object data is also retained, since no optimized object-data item was acquired.

Further, according to object-ID (=N220) data 2107, only internal-link information is retained as meta data 2108, so as to use data 2114 on the ID (=N221) of the acquired optimized object-data item. Further, according to object-ID (=N230) data 2109, ordinary intermediate object data is retained, since no optimized object-data item was acquired.

Thus, according to the intermediate-file data 2100 shown in FIG. 14, object data identified by the object-ID data 2101, the object-ID data 2103, the object-ID data 2105, the object-ID data 2106, the object-ID data 2107, and the object-ID data 2109 is provided, as intermediate-object data 2122 acquired from an internal link. Further, optimized object data identified by the object-ID data 2112, the object-ID data 2113, and the object-ID data 2114 is provided, as "optimized internal-object data" 2123 acquired from an external link.

Thus, according to the first embodiment, an object-data item optimized for print settings is acquired from the image-processing apparatus 1002 and/or the image-processing apparatus 1000, and intermediate data including a combination of plural object-data items including the acquired optimized object-data item is generated. Then, the generated intermediate data is converted into bitmap data generated in pages and printing is performed. Consequently, intermediate data optimized for print settings can be used in arbitrary objects. Therefore, the speed with which printing and outputting are performed by using intermediate data and the user's convenience can be increased. Further, the efficiency of the printing and the outputting can be increased by using data on the history of processing that had been performed for the same file data.

Further, in the first embodiment, history information (optimization information) is retained in intermediate-file data, as meta data. Therefore, even though the intermediate-file data is transferred via a portable medium, an optimized object-data item can be reused on a network which is the transfer destination of the intermediate-file data only by changing external-link information, which further increases the user's convenience.

Second Embodiment

Next, a second embodiment of the present invention will be described. According to the first embodiment, printing and outputting are not performed based on the intermediate-file data 1800 transferred from the image-processing apparatus 1000 to the image-processing apparatus 1002. Therefore, no optimized object data is generated in the intermediate-file data 1800.

However, as described with reference to FIGS. 10 and 11, an optimized object-data item is generated in the image-processing apparatus 1002 when printing and outputting are performed based on the intermediate-file data 1800. In that case, when printing and outputting are performed for a second time and thereafter, the optimized object-data item generated in the image-processing apparatus 1002 can be used at step S1504 shown in FIG. 15. Thus, the second embodiment is equivalent to the first embodiment except for part of the processing performed for the intermediate-file data 1800 transferred from the image-processing apparatus 1000 to the image-processing apparatus 1002. Therefore, in the second embodiment, the same components and data items as those used in the first embodiment are designated by the same reference numerals shown in FIGS. 1 to 21, and detailed descriptions thereof will be omitted.

Figure 22:
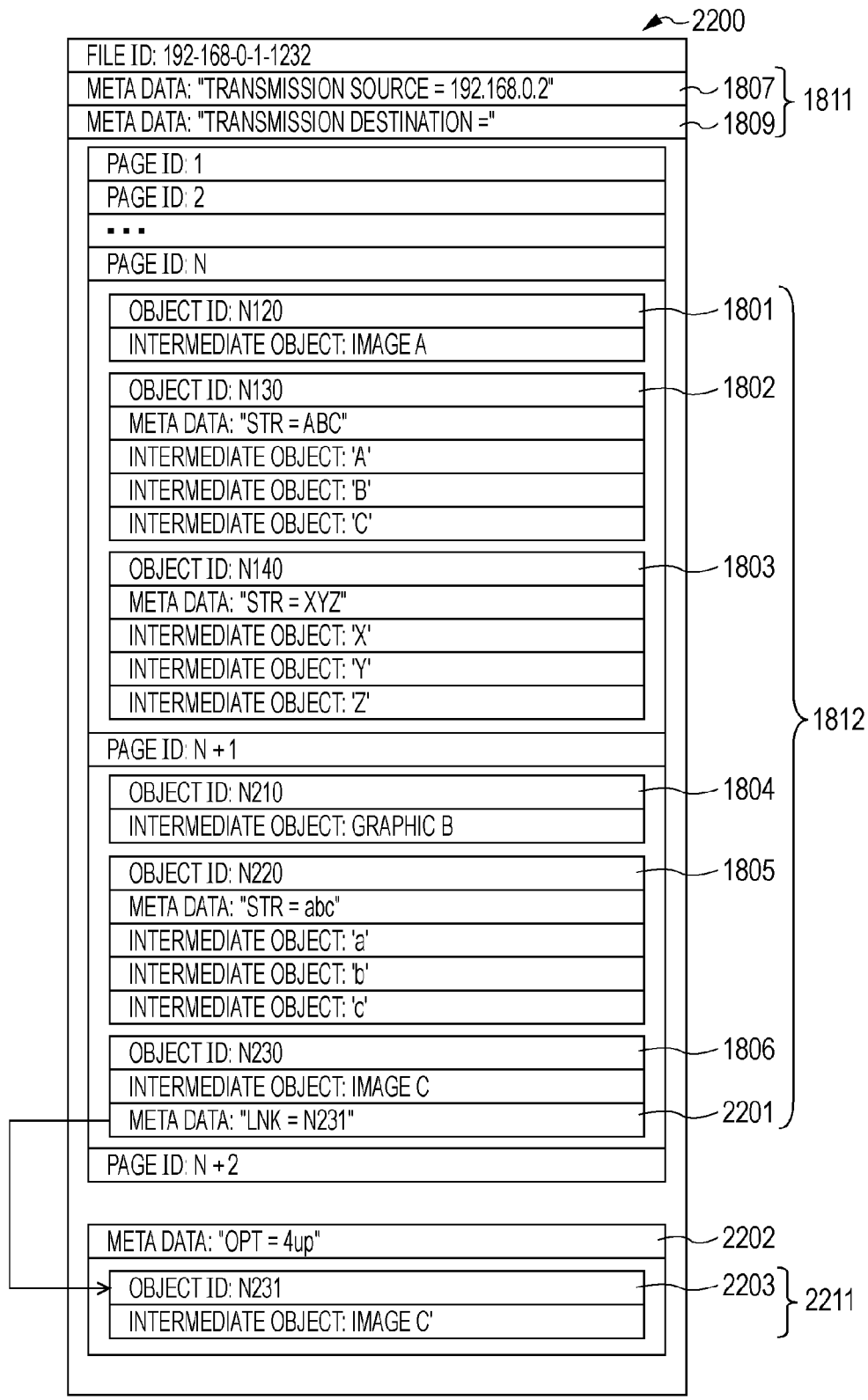
FIG. 22 conceptually shows an exemplary configuration of intermediate-file data stored in the file-management unit after printing and outputting are performed through the image-processing apparatus according to a second embodiment of the present invention.

FIG. 22 conceptually shows an exemplary configuration of intermediate-file data 2200 stored in the file-management unit 114 after printing and outputting are performed through the image-processing apparatus 1002. According to the intermediate-file data 2200, the object-ID (=N230) data 1806 is monochrome-image-object data compressed in the run-length format. Therefore, the generated optimized object-data item is stored as object-ID (=N231) data 2203 based on the storage-propriety-flag data 1602 set on the drawing-capability-information-management table 1600 and the storage-propriety-flag data 1702 set on the storage-setting-by-object-management table 1700.

Further, meta data (internal-link information) 2201 indicating an internal link to the optimized object-ID data 2203 is added to the object-ID (=N230) data 1806. Thus, according to the intermediate-file data 2200 shown in FIG. 22, object data identified by the object-ID data 2203 is provided as intermediate-object data 2211 optimized for the print settings (outputting through 4-up printing).

Figure 23:
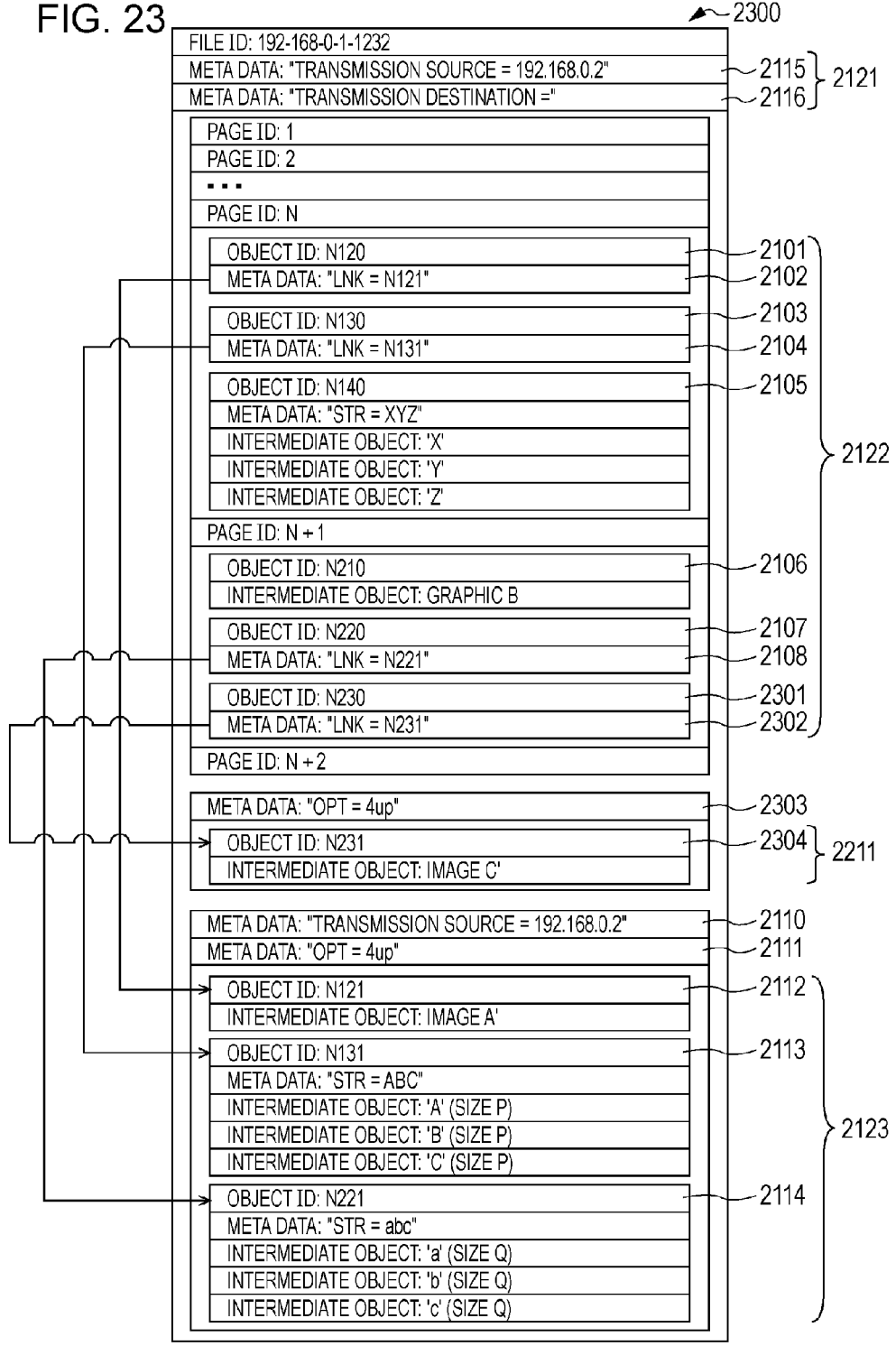
FIG. 23 conceptually shows an exemplary configuration of intermediate-file data obtained after combining is performed, the intermediate-file data being used for performing printing and outputting for a second time and thereafter through the image-processing apparatus according to the second embodiment.

FIG. 23 conceptually shows an exemplary configuration of intermediate-file data 2300 obtained after combining is performed, the intermediate-file data 2300 being used for performing printing and outputting for a second time and thereafter.

According to the intermediate-file data 2300 shown in FIG. 23, for object-ID (=N230) data 2301, only internal-link information is retained as meta data 2302, so as to use acquired optimized-object-ID (=N231) data 2304. Thus, according to the intermediate-file data 2300 shown in FIG. 23, object data identified by the object-ID data 2304 becomes the "optimized intermediate-object data" 2211 acquired from the internal link. Thus, in the second embodiment, printing is executed by using the intermediate-file data 2300 so that print processing is executed by using optimized object data generated by the image-processing apparatus 1002 itself and optimized object data acquired from another image-processing apparatus, that is, the image-processing apparatus 1000.

Since the second embodiment of the present invention allows for printing data by using intermediate data in objects, the intermediate data corresponding to print settings, the speed with which the printing is executed by using the intermediate data can be increased.

Other Embodiments

Each of units and/or steps included in the image-processing apparatuses and/or the image-processing methods according to the above-described embodiments of the present invention can be achieved by an operating program stored in a random-access memory (RAM) and/or a read-only memory (ROM) of a computer. The program and/or a computer-readable recording medium storing the program constitutes another embodiment of the present invention.

Further, each of a system, an apparatus, a method, a program, a storage medium, etc. may constitute another embodiment of the present invention. More specifically, the present invention can be used for a system including plural units, or an apparatus including a single unit only.

Further, program code of software implementing the functions of the above-described embodiments (program code corresponding to the flowcharts of FIGS. 3, 8, 10, 11, and 15 in the above-described embodiments) is supplied to the system and/or the apparatus directly and/or remotely. Then, a computer of the system and/or the apparatus reads and executes the supplied program code so that the functions of the above-described embodiments can be achieved, which constitutes another embodiment of the present invention.

Therefore, the program code itself installed in the computer, so as to achieve functional processing of the present invention by the computer, also constitutes another embodiment of the present invention. Namely, a computer program itself provided to achieve the functional processing can constitute another embodiment of the present invention.

In that case, the above-described computer program may be object code, a program executed by an interpreter, script data supplied to an operating system (OS), etc., so long as the computer program has program functions.

A recording medium provided to supply the program may be, for example, a floppy (registered trademark) disk, a hard disk, an optical disk, a magneto-optical disk, a magneto-optical disk (MO), a compact disk (CD)-read only memory (ROM), a CD-recordable (R), a CD-rewritable (RW), etc. The above-described recording medium may further be a magnetic tape, a nonvolatile memory card, a ROM, a digital-versatile disk (DVD) including a DVD-ROM and a DVD-R, etc.

Further, the program may be supplied in the following methods. For example, a user accesses a home page established on the Internet by using a browser of a client computer. Then, the user downloads the computer program itself of the present invention from the home page and/or compressed file data including data on an automatic-install function to a recording medium such as a hard disk.

Further, the program can be supplied by dividing program code generating the program of the present invention into plural file-data items and downloading the file-data items from different home pages. Namely, a WWW server provided to download program-file-data items used to achieve the functional processing of the present invention by using a computer to plural users also constitutes another embodiment of the present invention.

Further, the program of the present invention may be encoded and stored in storage mediums such as CD-ROMs distributed to users. Then, key information used to decode the encoded program may be downloaded from the home page to a user satisfying predetermined conditions via the Internet. Through the use of the downloaded key information, the encoded program can be executed and installed in a computer so that the program is supplied to the system and/or the apparatus.

Further, not only by the computer reading and executing the read program, but also by the computer executing part of or the entire process utilizing an OS, etc. running on the computer based on instructions of the program, the functions of the above-described embodiments may be achieved.

Further, the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-183433 filed on Jul. 12, 2007, which is hereby incorporated by reference herein in its entirety.

What is claimed is:

1. An image-processing apparatus having a memory, the image-processing apparatus comprising:
    an input unit configured to input print-setting data and print-target-file data;
    a searching unit configured to search processing data corresponding to the print-setting data from the memory;
    a specifying unit configured to specify transmission source information of the print-target-file data responsive to the processing data corresponding to the print-setting data not being searched by the searching unit;
    an inquiring unit configured to inquiry the processing data to an external device of the transmission source information specified by the specifying unit;
    a receiving unit configured to receive receiving information from the external device in response to the inquiry by the inquiring unit;
    a determination unit configured to determine whether acquirable processing data is included in the receiving information;
    a transmitting unit configured to transmit a transfer request of the acquirable processing data to the external device in response to the determination unit determining that the acquirable processing data is included in the receiving information;
    an acquisition unit configured to acquire the processing data corresponding to the print-setting data in response to the transfer request transmitted by the transmitting unit; and
    a print-processing-execution unit configured to generate print data by using the processing data acquired by the acquisition unit and execute print processing,
    wherein the searching unit searches the processing data from the memory before the acquisition unit acquires the processing data from the external device.

2. The image-processing apparatus according to claim 1, wherein the print-processing-execution unit combines first processing data for the print-setting data and second processing data for the print-setting data, generates print data by using the combined processing data, and executes the print processing.

3. The image-processing apparatus according to claim 1, further comprising:
   a storage unit configured to associate the processing data with print-setting information indicating print settings corresponding to the processing data, and to store the processing data and the print-setting information in the memory,
   wherein the print-processing-execution unit executes re-print processing by using the processing data stored by the storage unit and the processing data acquired by the acquisition unit.

4. An image-processing method for an image-processing apparatus having a memory, the image-processing method comprising:
   inputting print-setting data and print-target-file data;
   searching processing data corresponding to the print-setting data from the memory;
   specifying transmission source information of the print-target-file data responsive to the processing data corresponding to the print-setting data not being searched;
   inquiring the processing data to an external device of the specified transmission source information;
   receiving receiving information from the external device in response to the inquiry;
   determining whether acquirable processing data is included in the receiving information;
   transmitting a transfer request of the acquirable processing data to the external device in response determining that the acquirable processing data is included in the receiving information;
   acquiring the processing data corresponding to the print-setting data in response to the transmitted transfer request; and
   generating print data by using the acquired processing data and executing print processing,
   wherein searching includes searching the processing data from the memory before acquiring the processing data from the external device.

5. A non-transitory computer storage medium having a computer program stored thereon for causing a computer to execute an image-processing method according to claim 4.

* * * * *